April 18, 1967 W. G. McCLEAN 3,314,622
MECHANISM FOR DRIVING AND CENTERING A MANDREL
Filed Jan. 21, 1965
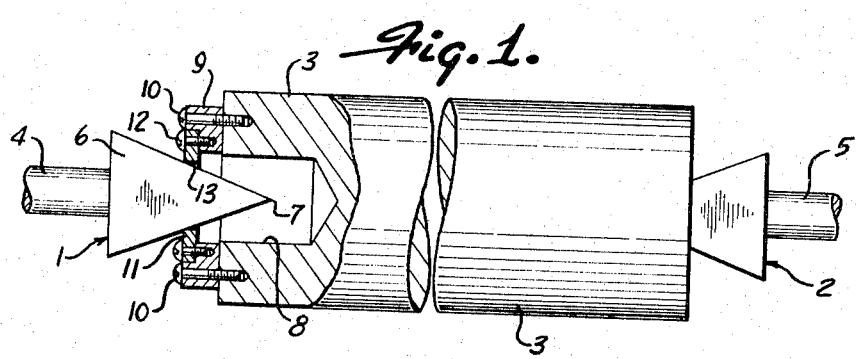
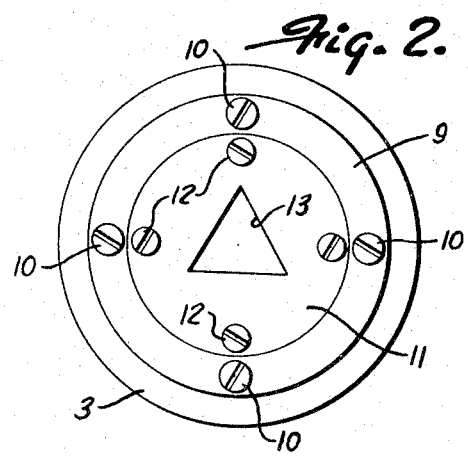
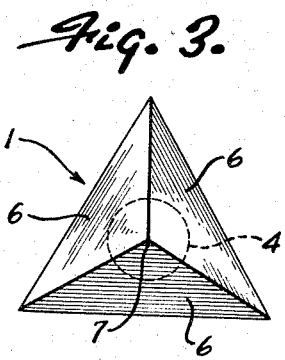
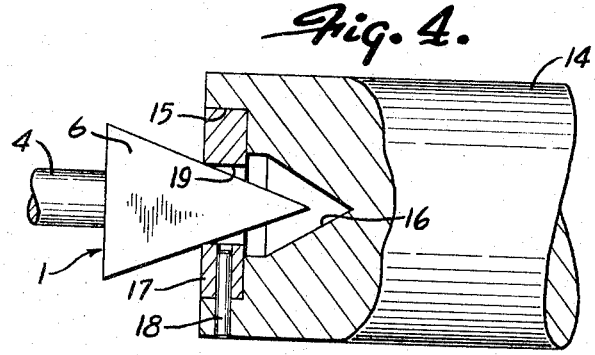
INVENTOR.
WILLIAM GEORGE McCLEAN
BY
Andrus & Starke
ATTORNEYS United States Patent Office 3,314,622
Patented Apr. 18, 1967

3,314,622
MECHANISM FOR DRIVING AND CENTERING A MANDREL
William George McClean, Milwaukee, Wis., assignor to McClean-Anderson, Inc., Milwaukee, Wis., a corporation of Wisconsin
Filed Jan. 21, 1965, Ser. No. 427,020
1 Claim. (Cl. 242—46.21)

This invention relates to a drive mechanism for a mandrel and more particularly to a mechanism for driving and centering a mandrel used in a filament winding apparatus.

Fiber reinforced plastic articles can be fabricated by winding a strand of resin impregnated fibers or filaments around a mandrel in a generally helical pattern. The strand is normally wound in a series of superimposed layers with each alternate layer having the opposite helix angle to provide the desired mechanical properties for the tubular article. After curing of the resin, a strong integral structure is obtained.

In most filament winding processes the mandrel is rotated about its axis and a winding head reciprocates along the length of the mandrel to lay the fiber strand on the mandrel in the helical pattern. To rotate the mandrel in the conventional device, a generally conical drive spindle is engaged within an accurately machined conical recess in the end of the mandrel. In addition, an aligning pin is provided on the spindle which is received within a suitable hole in the end of the mandrel and the pin prevents relative rotation between the members as well as centering the mandrel with respect to the spindle.

The resin, which is used to impregnate the fibrous strand, is normally in a sticky or tacky condition and during the winding operation, resin frequently contacts the ends of the mandrel and may tend to accumulate in the recess or hole in the mandrel end as well as a gathering on the drive spindle and aligning pin. Not only is the resin difficult to remove from the spindle and mandrel, but the accumulation of resin destroys the close tolerances which are required for the proper centering and driving engagement between the members. Thus, it is necessary to thoroughly clean the drive spindle as well as the openings in the mandrel end at the end of each winding operation to insure the proper drive connection between the members.

A second difficulty encountered with the conventional mandrel drive mechanism is that the aligning pin must necessarily be made of hardened steel as a substantial torque is applied to the pin during rotation. Because of the brittle nature of the hardened aligning pin, the pins are occasionally broken off with the result that the spindle has to be scrapped.

The present invention is directed to a drive mechanism for a mandrel used in a filament winding apparatus which provides a positive drive connection as well as positively centering the mandrel with respect to the spindle. In addition, the drive mechanism of the invention eliminates the need for close machined tolerances between the spindle and mandrel and thus is not as susceptive to misalignment resulting from resin accumulation as the conventional drive mechanisms which require precise tolerances. According to the invention, each end of the mandrel is provided with a recess, and a plate is secured to the end of the mandrel and encloses the recess. The plate is provided with a multi-sided opening and a tapered spindle having a series of flat outer surfaces, corresponding in number with the sides of the opening, is engaged within the opening. Engagement of the drive spindle with the multi-sided opening provides a positive rotational drive connection as well as accurately centering or aligning the spindle with the mandrel. As the spindle is engaged with the edges of the plate bordering the triangular opening and is not in contact with the walls of the mandrel defining the recess, the recess does not have to be machined to a close tolerance. Furthermore, any small resin accumulation within the recess of the mandrel is not serious because the spindle is spaced out of contact with the walls of the recess. If cleaning is required, the plate containing the opening can be readily removed from the mandrel.

Other objects and advantages will appear in the course of the following description.

The drawings illustrate the best mode presently contemplated of carrying out the invention.

In the drawings:

FIG. 1 is a side elevation with parts broken away showing the engagement of a pair of spindles with the ends of a mandrel;

FIG. 2 is an end view of the mandrel;

FIG. 3 is an end view of the drive spindle; and

FIG. 4 is a fragmentary side elevation, with parts broken away, showing a modified form of the invention.

FIGS. 1–3 show an improved mandrel drive mechanism for a filament winding apparatus, such as that disclosed in copending application Ser. No. 330,919, filed Dec. 16, 1963. According to the invention, a drive spindle 1 and an idler spindle 2 are connected to opposite ends of a generally cylindrical mandrel 3. The drive spindle 1 is attached to a shaft 4 which is driven by a drive mechanism such as that disclosed in the aforementioned copending application. The idler spindle 2 is secured to a shaft 5 which is journalled in the movable tailstock of the winding apparatus.

Spindles 1 and 2 are similar in structure, so the following description will be directed to only the spindle 1 and its connection to the mandrel 3. As shown in FIGS. 1 and 3, the spindle 1 has a generally pyramid shape formed by three generally flat surfaces 6 which terminate at an apex or tip 7. The end of the mandrel is provided with an axial recess 8 and a ring 9 is secured to the end of the mandrel bordering the recess 8 by a series of screws 10. An annular disc 11 is mounted within a recess formed in the ring 9 by screws 12 and the disc 11 is provided with a generally triangular opening 13 which receives the pyramid-shaped spindle 1. The flat surfaces 6 of the spindle 1 engage the edges of disc 11 bordering the opening 13 to provide a positive rotational connection between the drive spindle 1 and the mandrel 3, as well as providing a precise axial alignment of the spindle and the mandrel.

As the drive spindle 1 is in engagement with the edges of the disc 11 bordering opening 13, the recess 8 in the mandrel can be formed oversize without tolerance, and the spindle 1 is spaced inwardly of the walls of the recess, as shown in FIG. 1.

Frequently, during the filament winding operation, the resin will drip over the ends of the mandrel and accumulate on the spindle and mandrel end. In the present invention, there is no critical tolerance between the spindle 1 and the mandrel recess 8 and resin can accumulate within the recess 8 without interfering with the engagement of the spindle 1 with the opening 13 in the disc 11. Moreover, if after a period of time resin does collect in opening 13, the disc 11 can be readily removed from the mandrel for cleaning or replacement.

FIG. 4 shows a modified form of the invention in which a spindle 1 is employed to drive a mandrel 14 which is similar to mandrel 3 of the first embodiment. In this form of the invention, the mandrel 14 is provided with an axial recess which consists of an outer cylindrical section 15 and an inner conical section 16. Ring 17 is secured within the outer recess section 15 by a pin 18 and the ring 17 is provided with a triangular opening 19 similar to opening 13 of the first embodiment. Again, the recess, and particularly the conical section 16, is provided oversized so that there is no engagement between the surfaces 6 of the spindle and the walls of the recess. The engagement of spindle 1 with the walls bordering the opening 19 provide a positive rotational drive connection between the elements as well as accurately centering the mandrel with respect to the spindle. This structure again eliminates down time due to resin accumulation in that there are no critical tolerances between the spindle and the recess in the end of the mandrel.

While the above description has been directed to the use of a three-sided, tapered spindle 1, which is received within a triangular opening, it is contemplated that the spindle can have various non-circular cross sectional configurations and the opening 13 would have a complementary shape.

Various modes of carrying out the invention are contemplated as being within the scope of the following claims particularly pointing out and distinctly claiming the subject matter which is regarded as the invention.

I claim:

In a filament winding apparatus for winding a resin coated strand to form a tubular article, a spindle having an outer end tapered toward a tip and said outer end having a plurality of relatively sharp longitudinal edges, a mandrel having a recess in the end thereof to receive the spindle with the outer periphery of the end of the spindle being spaced radially inward from the walls of the mandrel defining said recess to provide a chamber therebetween, and a ring disposed on the end of the mandrel and having a central opening disposed in alignment with said recess, said opening having a plurality of corners and said edges of the spindle disposed in engagement with said corners to provide a positive rotational connection between the spindle and the mandrel and to precisely center the mandrel with respect to the spindle.

References Cited by the Examiner

FOREIGN PATENTS 414,975 8/1934 Great Britain.
45,644 9/1908 Switzerland.

STANLEY N. GILREATH, *Primary Examiner.*